(12) United States Patent
Kelley

(10) Patent No.: US 8,990,909 B2
(45) Date of Patent: Mar. 24, 2015

(54) OUT-OF-BAND CHALLENGE QUESTION AUTHENTICATION

(71) Applicant: Bank of America Corporation, Charlotte, NC (US)

(72) Inventor: William E. Kelley, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 17 days.

(21) Appl. No.: 13/926,009

(22) Filed: Jun. 25, 2013

(65) Prior Publication Data

US 2014/0380444 A1 Dec. 25, 2014

(51) Int. Cl.
*G06F 7/04* (2006.01)
*H04L 29/06* (2006.01)

(52) U.S. Cl.
CPC ..................................... *H04L 63/08* (2013.01)
USPC ............................................................ 726/7

(58) Field of Classification Search
CPC ................................ G06F 21/31; H04L 63/08
USPC ............................................................. 726/7
See application file for complete search history.

(56) References Cited

U.S. PATENT DOCUMENTS

| 7,076,657 | B2 | 7/2006 | Koukoulidis et al. | |
| 7,467,401 | B2 | 12/2008 | Cicchitto | |
| 7,958,347 | B1 | 6/2011 | Ferguson | |
| 8,346,217 | B2 | 1/2013 | Crawford et al. | |
| 8,380,629 | B2 | 2/2013 | Carlson et al. | |
| 8,443,425 | B1 | 5/2013 | Evans et al. | |
| 2002/0147914 | A1* | 10/2002 | Arnold | 713/186 |
| 2005/0138399 | A1* | 6/2005 | Cheston et al. | 713/189 |
| 2006/0015743 | A1* | 1/2006 | Camaisa et al. | 713/182 |
| 2008/0022375 | A1* | 1/2008 | Stanley | 726/5 |
| 2009/0047928 | A1 | 2/2009 | Utsch et al. | |
| 2010/0122341 | A1 | 5/2010 | Golle et al. | |
| 2011/0246757 | A1 | 10/2011 | Prakash et al. | |

FOREIGN PATENT DOCUMENTS

EP 2 533 486 A1 12/2012

* cited by examiner

*Primary Examiner* — Teshome Hailu
(74) *Attorney, Agent, or Firm* — Michael A. Springs

(57) ABSTRACT

A system and method for challenge question authentication comprises determining whether a log-in attempt requires additional authentication. A user attempts to log-in using a first application and a first delivery channel. When additional authentication is required, a challenge question is communicated to the user using a second application and a second delivery channel. The challenge question is specific to the user. An answer to the challenge question is received, and the user provides the answer using the first application and the first delivery channel. The log-in attempt is completed when the answer to the challenge question is correct.

20 Claims, 2 Drawing Sheets

OUT-OF-BAND CHALLENGE QUESTION AUTHENTICATION

TECHNICAL FIELD OF THE INVENTION

This invention relates generally to authentication techniques, and more particularly to out-of-band challenge question authentication.

BACKGROUND

Users interact with devices to perform any number of transactions. For example, a user may interact with an Automated Teller Machine (ATM) and/or an Automated Teller Assist (ATA) to withdraw money, cash a check, deposit a check, or perform an account inquiry. As another example, a user may interact with a laptop, a personal computer, a self-servicing device, or a smartphone to perform a transaction, such as access personal information or obtain information regarding a financial account. Because of the sensitive nature of the information, authentication of the user is important.

SUMMARY

According to embodiments of the present disclosure, disadvantages and problems associated with out-of-band challenge question authentication may be reduced or eliminated.

In certain embodiments, a system and method for challenge question authentication comprises determining whether a log-in attempt requires additional authentication. A user attempts to log-in using a first application and a first delivery channel. When additional authentication is required, a challenge question is communicated to the user using a second application and a second delivery channel. The challenge question is specific to the user. An answer to the challenge question is received, and the user provides the answer using the first application and the first delivery channel. The log-in attempt is completed when the answer to the challenge question is correct.

Certain embodiments of the present disclosure may provide one or more technical advantages. A technical advantage of one embodiment includes improving authentication techniques. Traditional step-up authentication is being deprecated, and the out-of-band challenge question authentication technique solves the problem of an unauthorized user gaining access to a user's account. Therefore, the security of the user's account may be maintained. Another technical advantage of an embodiment includes retaining the use of challenge questions, which is a user-friendly authentication technique, even though the effectiveness of challenge questions in a traditional context is diminishing. Yet another technical advantage includes using a mobile device as a delivery mechanism of challenge information. The use of mobile devices has become ubiquitous and using mobile devices to authenticate a user will facilitate an authentication technique that a user can easily adapt to.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
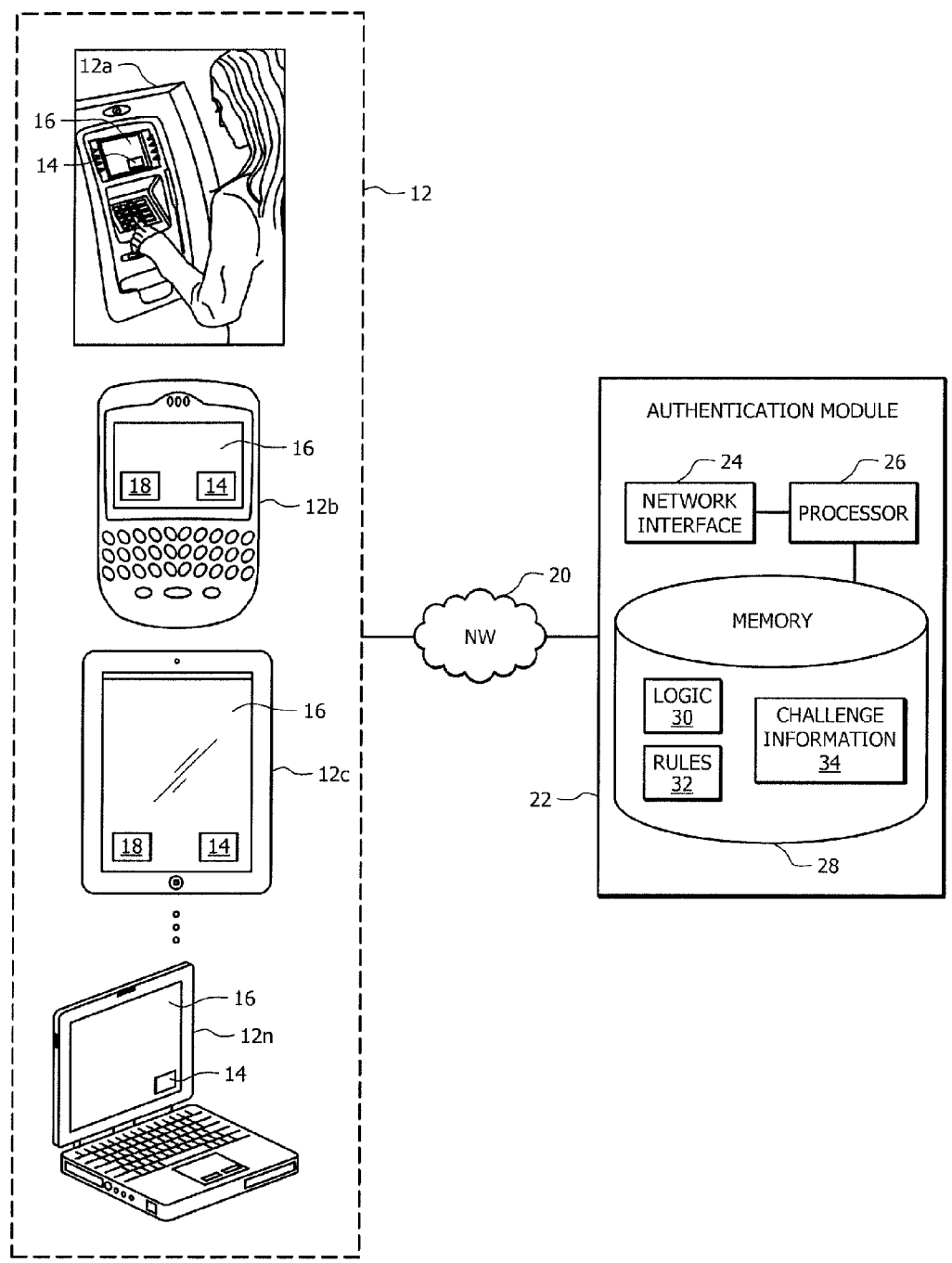
FIG. 1 illustrates a block diagram of a system for out-of-band challenge question authentication.
Figure 2:
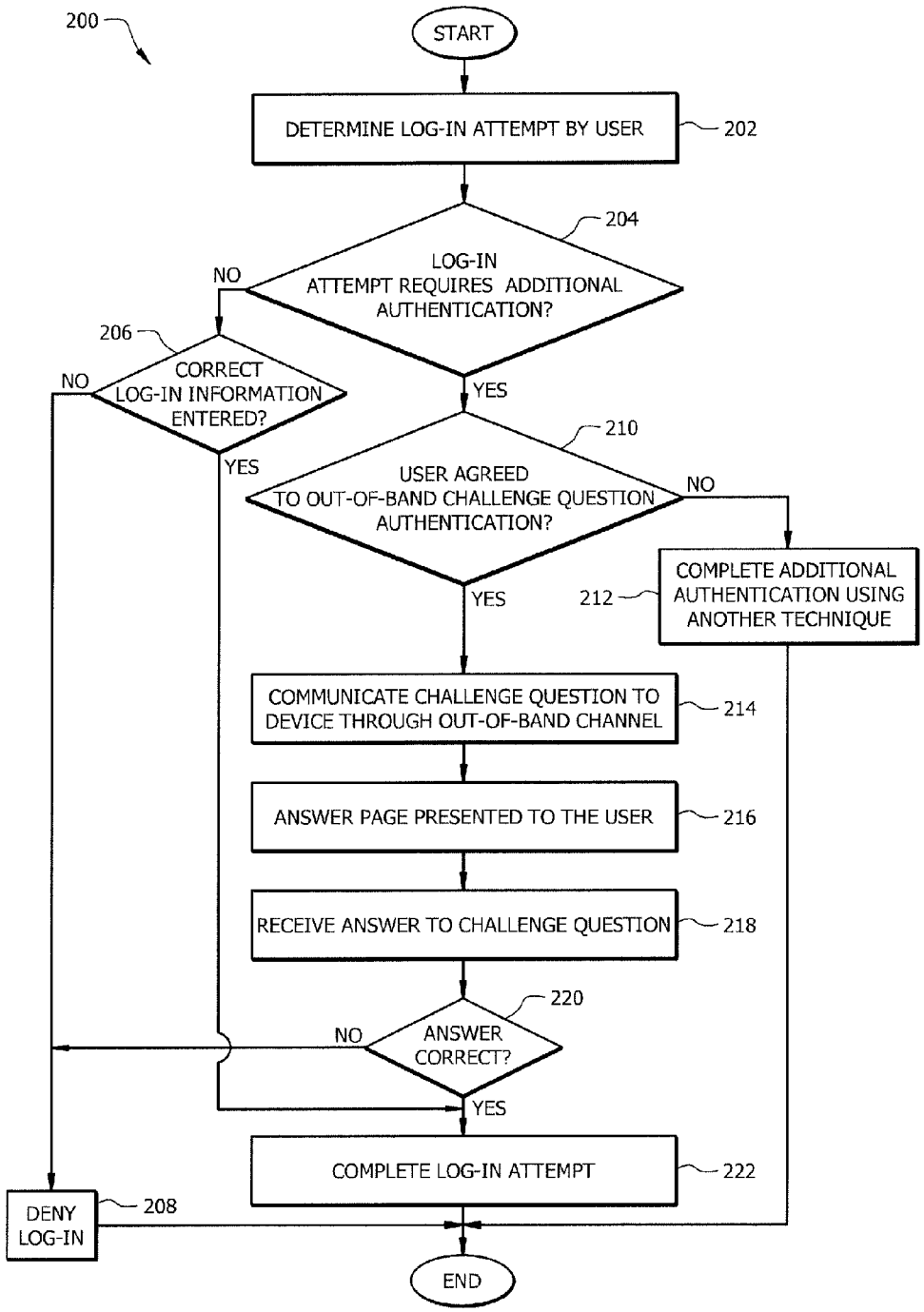
FIG. 2 illustrates an example flowchart for out-of-band challenge question authentication.

Embodiments of the present invention and its advantages are best understood by referring to FIGS. 1 through 2 of the drawings, like numerals being used for like and corresponding parts of the various drawings.

Users interact with devices to perform any number of transactions. For example, a user may interact with an Automated Teller Machine (ATM) and/or an Automated Teller Assist (ATA) to withdraw money, cash a check, deposit a check, or perform an account inquiry. As another example, a user may interact with a laptop, a personal computer, a self-servicing device, or a smartphone to perform a transaction, such as access personal information or obtain information regarding a financial account. Because of the sensitive nature of the information, authentication of the user is important. Traditional step-up authentication techniques that use challenge questions are being deprecated because of the prevalence of publicly-available information. Accordingly, the value of this easy authentication technique is being lost. Certain embodiments of the present disclosure provide a system and method for facilitating out-of-band challenge question authentication. The system and method disclosed provide an authentication technique that combines various communication methods or channels. The authentication technique may be used in various contexts, such as online banking and call centers.

FIG. 1 illustrates a block diagram of a system for out-of-band challenge question authentication. System 10 includes devices 12 that a user interacts with to access an account. Devices 12 include access applications 14 that facilitate interactions with the account by communicating through network 18, and authentication module 22 determines whether additional authentication is necessary to access the account and communicates with devices 12 to complete the authentication process.

System 10 includes devices 12a-12n, where n represents any suitable number, that allow a user to interact with an access application 14 to access an account. Device 12 communicates authentication information to authentication module 22, and certain of devices 12 may receive authentication related information from authentication module 22. A user may use any suitable authentication technique while using device 12. For example, a user may use an application to access an account to deposit a check, withdraw money, obtain account information, or complete any other suitable transaction. To access the account, the user enters authentication information into access application 14. For example, authentication information may include a username, a password, a personal identification number, a combination of the preceding, or any other suitable authentication information. In certain embodiments, a user may be required to enter additional authentication information. For example, if a user attempts to access an account using a device 12 than has not been previously used, additional authentication information may be required to access the account. To perform the additional authentication, device 12 receives the additional authentication information, and in particular embodiments, the additional authentication information is received on a different channel from which the user attempts to access the account.

For example, if a user attempts to access the account through an ATM, the user may receive the additional authentication information through a mobile phone. As another example, if a user attempts to access the account through access application 14 on a mobile phone, the additional authentication information may be communicated through Short Message Service ("SMS") on the mobile phone.

Examples of device 12 include a mobile phone, a personal digital assistant, a portable media player (e.g., portable video player, digital audio player, etc.), a laptop, a netbook, a Ultrabook™, a tablet, an ATM, a smart TV, or any other suitable device. Device 12 may be compatible with any suitable platform or operating system. For example, device 12 may include an Android™ device, an Apple® device, a Windows® device, a BlackBerry® device, or any other suitable device. Device 12 includes any necessary hardware and software suitable to carry out its functions. Certain embodiments of device 12 include an access application 14, graphical user interface (GUI) 16, and/or a messaging application 18.

Device 12 includes one or more access applications 14. Access application 14 represents any suitable software or logic that allows a user to access information, provides information to a user, and/or facilitates a user performing a transaction with an enterprise. For example, a user may launch access application 14 on device 12, input login credentials into access application 14, and gain access to a plurality of financial accounts serviced by the enterprise associated with access application 14. As another example, a user may input answers to challenge questions into access application 14. An administrator, the user of device 12, or any other suitable entity may change the configuration of access application 14. Access application 14 may include a native application or a hybrid application stored on mobile device 12.

In the illustrated embodiment, device 12 also includes a GUI 16 that displays information from access application 14 to a user to facilitate a user accessing an account using access application 14. For example, GUI 16 may display a login screen for a user to provide login credentials to access information using access application 14. GUI 16 is generally operable to tailor and filter data entered by and presented to the user. GUI 16 may provide the user with an efficient and user-friendly presentation of information using a plurality of displays having interactive fields, pull-down lists, and buttons operated by the user. GUI 16 may include multiple levels of abstraction including groupings and boundaries. It should be understood that the term GUI 16 may be used in the singular or in the plural to describe one or more GUIs 16 in each of the displays of a particular GUI 16.

In the illustrated embodiment, devices 12b and 12c also include one or more messaging applications 18. Messaging application 18 represents any suitable software or logic that facilitates the transmission and receipt of messages between components in system 10. For example, messaging application 18 may include a texting application that facilitates various messages, such as SMS, Multimedia Messaging Service ("MMS"), eXtended Messaging Service ("XMS"), Enhanced Messaging Service ("EMS"), or any other suitable messaging protocol. In certain embodiments, device 12 receives a message on messaging application 18, and the message includes additional authentication information. For example, the additional authentication information may include a challenge question for the user to answer. The user may input the answer to the challenge question into access application 14 using device 12 that the user was previously using to access the account.

Network 20 represents any suitable network operable to facilitate communication between the components of system 10, such as devices 12 and authentication module 22. Network 20 may include any interconnecting system capable of transmitting audio, video, signals, data, messages, or any combination of the preceding. Network 20 may include all or a portion of a public switched telephone network (PSTN), a cellular network, a base station, a gateway, a public or private data network, a LAN, a MAN, a WAN, a WWAN, a local, regional, or global communication or computer network, such as the Internet, a wireline or wireless network, an enterprise intranet, or any other suitable communication link, including combinations thereof, operable to facilitate communication between the components.

Authentication module 22 represents any suitable component that determines whether additional authentication is required to access an account, determines what additional authentication to receive from a user, communicates the additional authentication information to the user, and completes authentication of the user to allow the user to access the account. Authentication module 22 may include a network server, any suitable remote server, a mainframe, a host computer, a workstation, a web server, a personal computer, a file server, or any other suitable device operable to communicate with device 12. In some embodiments, authentication module 22 may execute any suitable operating system such as IBM's zSeries/Operating System (z/OS), MS-DOS, PC-DOS, MAC-OS, WINDOWS, UNIX, OpenVMS, Android™, or any other appropriate operating system, including future operating systems. The functions of authentication module 22 may be performed by any suitable combination of one or more servers or other components at one or more locations. In the embodiment where authentication module 22 is a server, the server may be a private server, or the server may be a virtual or physical server. The server may include one or more servers at the same or remote locations. Also, authentication module 22 may include any suitable component that functions as a server. In the illustrated embodiment, authentication module 22 includes a network interface 24, a processor 26, and a memory 28.

Network interface 24 represents any suitable component operable to receive information from network 20, transmit information through network 20, perform processing of information, communicate with other devices, or any combination of the preceding. For example, network interface 24 receives authentication information from access application 14 of device 12 when a user desires to access an account. As another example, network interface 24 communicates additional authentication information to messaging application 18 of device 12. Network interface 24 represents any port or connection, real or virtual, including any suitable hardware and/or software, including protocol conversion and data processing capabilities, to communicate through a LAN, WAN, or other communication system that allows authentication module 22 to exchange information with devices 12, network 20, or other components of system 10.

Processor 26 communicatively couples to network interface 24 and memory 28, and controls the operation and administration of authentication module 22 by processing information received from network interface 24 and memory 28. Processor 26 includes any hardware and/or software that operates to control and process information. For example, processor 26 executes logic 30 to control the operation of authentication module 22. Processor 26 may be a programmable logic device, a microcontroller, a microprocessor, any suitable processing device, or any suitable combination of the preceding.

Memory 28 stores, either permanently or temporarily, data, operational software, or other information for processor 26.

Memory 28 includes any one or a combination of volatile or non-volatile local or remote devices suitable for storing information. For example, memory 28 may include Read Only Memory ("ROM"), Random Access Memory ("RAM"), magnetic storage devices, optical storage devices, or any other suitable information storage device or a combination of these devices. While illustrated as including particular modules, memory 28 may include any suitable information for use in the operation of authentication module 22. In the illustrated embodiment, memory 28 includes logic 30, authentication rules 32, and challenge information 34.

Logic 30 generally refers to rules, algorithms, code, tables, and/or other suitable instructions embodied in a computer-readable storage medium for performing the described functions and operations of authentication module 22. For example, logic 30 facilitates the determination of whether additional authentication is required when a user attempts to access an account. Logic 30 also facilitates the determination of what additional authentication information to communicate to messaging application 18, and facilitates the determination of whether the additional authentication received is correct.

Authentication rules 32 generally refer to logic, algorithms, code, tables, and/or other suitable instructions embodied in a computer-readable storage medium that facilitate authentication decisions. For example, authentication rules 32 may be used to determine whether a user has entered correct log-in information to access the account. As another example, authentication rules 32 facilitate determining whether additional authentication is required when a user attempts to access an account. In this example, authentication rules 32 may require additional authentication if any suitable criteria occurs, such as using a foreign device to access the account, inputting incorrect log-in information more than a particular number of times, attempting to access an account from a location that is not consistent with the account information, attempting to access the account from a high-risk location, attempting to access the account at an unusual time of day, or any other suitable criteria that may indicate the potential of fraudulent conduct.

Challenge information 34 represents any suitable information that an enterprise may use as additional authentication for a user to access an account. For example, challenge information 34 may include challenge questions and the corresponding answers to the questions. The challenge questions may be specifically associated with the user. In an embodiment, during the enrollment process, a user determines one or more challenge questions to use for authentication and provides the associated answers. Authentication module 22 may subsequently access the predefined challenge questions to implement the out-of-band authentication. In an embodiment, authentication module 22 determines a challenge question to present to a user via the out-of-band channel, communicates the challenge question to the user via the out-of-band channel, and determines whether the answer entered by the user is correct, based on challenge information 34.

In an exemplary embodiment of operation, a user of device 12 interacts with access application 14 to access an account. The user may access the account on any suitable device, such as an ATM, a mobile device, a laptop, a computer, or a tablet. To access the account, the user enters log-in credentials into access application 14. Authentication module 22 determines whether additional authentication is required based on rules 32. For example, additional authentication may be required if the user attempts to access the account from a device that is not typically used. As another example, additional authentication may be required if a user attempts to access the account from a location that is out of the ordinary or does not match the typical behavior of the user. As yet another example, additional authentication may be required if the user enters incorrect log-in credentials more than a particular number of times.

If additional authentication is required, authentication module 22 communicates a challenge question from challenge information 34 to device 12 using an out-of-band channel. For example, authentication module 22 may communicate the challenge question through text messaging to device 12b. In an embodiment, authentication module 22 communicates the challenge question to a different device 12 than device 12 executing access application 14. For example, a user attempts to access the account using access application 14 on device 12a, but receives the challenge question through messaging application 18 on device 12b. When authentication module 22 communicates the challenge question to device 12, authentication module 22 may notify the access application 14 of the additional authentication and access application 14 updates the interface accordingly. For example, access application 14 may change the interface to a screenshot that allows a user to input the answer to the challenge question.

Once user receives the challenge question through messaging application 18, the user may enter the question into access application 14. Authentication module 22 determines whether the answer is correct based on challenge information 34. Authentication module 22 completes the log-in attempt to access the account if the answer is correct and denies the log-in attempt if the answer is incorrect.

A component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, authentication module 22 may use any suitable communication channel to communicate the challenge question to device 12. As another example, authentication module 22 communicates the challenge question to any suitable device. As yet another example, system 10 may include any number of devices 12, networks 20, and authentication module 22. As another example, memory 28 of authentication module 22 may include attributes associated with the delivery of the challenge question, such as the phone number of a mobile device, an International Mobile Subscriber Identity of a mobile device, or any other suitable identifier that facilitates communicating messages. As another example, location services can be used to determine whether the user's location during the log-in attempt matches the location of device 12 to receive the challenge question. Confirming the location of the user and device 12 further improves the strength of the authentication technique. Any suitable logic may perform the functions of system 10 and the components within system 10.

FIG. 2 illustrates an example flowchart 200 for out-of-band challenge question authentication. At step 202, authentication module 22 determines a log-in attempt by a user. As discussed above, a user may enter log-in credentials into access application 14, and authentication module 22 determines that a log-in has been attempted.

Based on the log-in attempt, authentication module 22 determines whether additional authentication is required at step 204. Authentication module 22 considers rules 32 associated with the log-in attempt and if the rules are not satisfied, authentication module 22 may request additional authentication and the method proceeds to step 210. If the log-in attempt satisfies rules 34 and additional authentication is not required, the method proceeds to step 206 and it is determined whether the correct log-in information is entered. If the correct information is entered, the log-in attempt is completed at step 222, and if the correct information is not entered, the log-in attempt is denied at step 208.

When authentication module 22 requires additional authentication, authentication module 22 determines whether the user has agreed to out-of-band challenge question authentication at step 210. It may be necessary to obtain a user's agreement to use this authentication technique because the user may incur additional service charges associated with device 12. Additionally, having a user enroll in the challenge question authentication technique facilitates getting the necessary information from the user, such as the messaging delivery attribute and storing that information for subsequent use.

If the user has agreed to out-of-band challenge question authentication, authentication module 22 communicates the challenge question to device 12 using an out-of-band channel. For example, if the user attempts to access accounts using access application 14, authentication module 22 may communicate the challenge question to messaging application 18. Authentication module 22 may communicate the challenge question to a difference device 12 than device 12 executing access application 14. Authentication module 22 may communicate the challenge question using any suitable messaging technique, such as SMS, MMS, XMS, and EMS.

When authentication module 22 communicates the challenge question, an answer page is presented to the user at step 216. The answer page is presented in access application 14 and the answer to the challenge question can be entered. Authentication module 22 receives the answer to the challenge question at step 218 and determines whether the answer is correct at step 220. Authentication module 22 may access challenge information 34 to determine whether the answer is correct for the challenge question posed to the user. If the answer is correct, authentication module 22 completes the log-in attempt at step 222 and the user gains access to the account. If the answer is incorrect, authentication module 22 denies the log-in attempt at step 208 and the user cannot access the account.

Modifications, additions, or omissions may be made to flowchart 200 depicted in FIG. 2. The method may include more, fewer, or other steps. For example, steps may be performed in parallel or in any suitable order. While discussed as authentication module 22 performing the steps, any suitable component of system 10 may perform one or more steps of the method.

Certain embodiments of the present disclosure may provide one or more technical advantages. A technical advantage of one embodiment includes improving authentication techniques. Traditional step-up authentication is being deprecated, and the out-of-band challenge question authentication technique solves the problem of an unauthorized user gaining access to a user's account. Therefore, the security of the user's account may be maintained. Another technical advantage of an embodiment includes retaining the use of challenge questions, which is a user-friendly authentication technique, even though the effectiveness of challenge questions in a traditional context is diminishing. Yet another technical advantage includes using a mobile device as a delivery mechanism of challenge information. The use of mobile devices has become ubiquitous and using mobile devices to authenticate a user will facilitate an authentication technique that a user can easily adapt to.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus for authenticating a log-in attempt, comprising:
   a processor operable to:
      receive the log-in attempt from a user using a first application and a first delivery channel; and
      determine a first location associated with the user during the log-in attempt;
   a network interface communicatively coupled to the processor is operable to:
      communicate a user-specific challenge question to a device associated with the user using a second application and a second delivery channel and the processor is further operable to determine a second location, wherein the second location is the location of the device associated with the user;
      the network interface is further operable to receive an answer to the user-specific challenge question using the first application and the first delivery channel and the processor is further operable to complete the log-in attempt when the answer to the challenge question is correct and the first location and the second location match.

2. The apparatus of claim 1, wherein the second delivery channel comprises text messaging.

3. The apparatus of claim 1, wherein the network interface is further operable to communicate an answer page to the first application, the answer page is associated with the challenge question and accepts a response to the challenge question.

4. The apparatus of claim 1, further comprising a memory operable to store one or more rules associated with user authentication, wherein:
   the processor is further operable to apply the one or more rules to the log-in attempt to determine whether the log-in attempt satisfies at least one of the one or more rules;
   the network interface is further operable to communicate an additional authentication requirement to the user when the at least one of the one or more rules is not satisfied.

5. The apparatus of claim 1, wherein the network interface is further operable to communicate the challenge question to a mobile device associated with the user and the first application is not being executed on the mobile device.

6. The apparatus of claim 1, wherein the network interface is further operable to communicate the challenge question to a mobile device associated with the user and the first application is being executed on the mobile device.

7. The apparatus of claim 1, wherein the processor is further operable to determine whether the log-in attempt to online banking requires additional authentication.

8. Non-transitory computer readable medium comprising logic, the logic, when executed by a processor, operable to:
- receive a log-in attempt from a user using a first application and a first delivery channel;
- determine a first location associated with the user during the log-in attempt;
- communicate a user-specific challenge question to a device associated with the user using a second application and a second delivery channel;
- determine a second location, wherein the second location is the location of the device associated with the user;
- receive an answer to the user-specific challenge question using the first application and the first delivery channel;
- complete the log-in attempt when the answer to the challenge question is correct and the first location and the second location match.

9. The computer readable medium of claim 8, wherein the logic is further operable to communicate an answer page to the first application, the answer page is associated with the challenge question and accepts a response to the challenge question.

10. The computer readable medium of claim 8, wherein the logic is further operable to:
- store one or more rules associated with user authentication;
- apply the one or more rules to the log-in attempt to determine whether the log-in attempt satisfies at least one of the one or more rules;
- communicate an additional authentication requirement to the user when the at least one of the one or more rules is not satisfied.

11. The computer readable medium of claim 8, wherein communicating the challenge question to the user through the second delivery channel comprises communicating the challenge question to a mobile device associated with the user and the first application is not being executed on the mobile device.

12. The computer readable medium of claim 8, wherein communicating the challenge question to the user through the second delivery channel comprises communicating the challenge question to a mobile device associated with the user and the first application is being executed on the mobile device.

13. The computer readable medium of claim 8, wherein determining whether the log-in attempt to the secure environment requires additional authentication comprises determining whether the log-in attempt to online banking requires additional authentication.

14. A method for authenticating a log-in attempt, comprising:
- receiving the log-in attempt from a user using a first application and a first delivery channel;
- determining a first location associated with the user during the log-in attempt;
- communicating a user-specific challenge question to a device associated with the user using a second application and a second delivery channel;
- determining a second location, wherein the second location is the location of the device associated with the user;
- receiving an answer to the user-specific challenge question, using the first application and the first delivery channel;
- completing the log-in attempt when the answer to the challenge question is correct and the first location and the second location match.

15. The method of claim 14, wherein the second delivery channel comprises text messaging.

16. The method of claim 14, further comprising communicating an answer page to the first application, the answer page is associated with the challenge question and accepts a response to the challenge question.

17. The method of claim 14, further comprising:
- storing one or more rules associated with user authentication;
- applying the one or more rules to the log-in attempt to determine whether the log-in attempt satisfies at least one of the one or more rules;
- communicating an additional authentication requirement to the user when the at least one of the one or more rules is not satisfied.

18. The method of claim 14, wherein communicating the challenge question to the user through the second delivery channel comprises communicating the challenge question to a mobile device associated with the user and the first application is not being executed on the mobile device.

19. The method of claim 14, wherein communicating the challenge question to the user through the second delivery channel comprises communicating the challenge question to a mobile device associated with the user and the first application is being executed on the mobile device.

20. The method of claim 14, wherein determining whether the log-in attempt to the secure environment requires additional authentication comprises determining whether the log-in attempt to online banking requires additional authentication.

* * * * *